United States Patent
Hundemer

(10) Patent No.: US 10,334,325 B2
(45) Date of Patent: *Jun. 25, 2019

(54) USE OF A PROGRAM SCHEDULE TO MODIFY AN ELECTRONIC DICTIONARY OF A CLOSED-CAPTIONING GENERATOR

(71) Applicant: Tribune Broadcasting Company, LLC, Chicago, IL (US)

(72) Inventor: Hank J. Hundemer, Bellevue, KY (US)

(73) Assignee: TRIBUNE BROADCASTING COMPANY, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,720

(22) Filed: Nov. 20, 2017

(65) Prior Publication Data

US 2018/0077468 A1  Mar. 15, 2018

Related U.S. Application Data

(63) Continuation of application No. 14/626,592, filed on Feb. 19, 2015, now Pat. No. 9,854,329.

(51) Int. Cl.
| | |
|---|---|
| G06F 17/21 | (2006.01) |
| H04N 21/81 | (2011.01) |
| G06F 17/27 | (2006.01) |
| H04N 7/088 | (2006.01) |
| H04N 21/488 | (2011.01) |

(52) U.S. Cl.
CPC ..... *H04N 21/8133* (2013.01); *G06F 17/2735* (2013.01); *H04N 7/0885* (2013.01); *H04N 21/4884* (2013.01)

(58) Field of Classification Search
CPC .......... H04N 21/4884; H04N 21/8133; H04N 7/0885; G06F 17/2735; G06F 3/0481
USPC .................. 704/1, 9, 10; 725/39, 50, 53, 59; 348/468, 552, E5.102, E7.018, E7.033
See application file for complete search history.

(56) References Cited

U.S. PATENT DOCUMENTS

| | | | |
|---|---|---|---|
| 5,543,851 A * | 8/1996 | Chang | H04N 5/44513 348/468 |
| 5,774,859 A | 6/1998 | Houser et al. | |
| 6,243,676 B1 | 6/2001 | Witteman | |
| 6,961,954 B1 | 11/2005 | Maybury et al. | |
| 7,215,436 B2 | 5/2007 | Hull et al. | |
| 7,412,441 B2 * | 8/2008 | Scott, III et al. | G06F 17/30637 |

(Continued)

FOREIGN PATENT DOCUMENTS

WO   2010120439 A1   10/2010

OTHER PUBLICATIONS

U.S. Appl. No. 14/626,592, filed Feb. 19, 2015.

(Continued)

*Primary Examiner* — Charlotte M Baker
(74) *Attorney, Agent, or Firm* — McDonnell Boehnen Hulbert & Berghoff LLP

(57) ABSTRACT

In one aspect, an example method involves accessing data representing a program schedule of a media program, wherein the program schedule comprises first text. The method also includes selecting second text from among the first text. The method further includes transmitting, via a communication network, an instruction configured to cause the selected second-text to be added to an electronic dictionary of a closed-captioning generator.

20 Claims, 6 Drawing Sheets

(56) References Cited

U.S. PATENT DOCUMENTS

| | | | |
|---|---|---|---|
| 9,444,862 B2* | 9/2016 | Prakash | H04L 65/4084 |
| 2001/0003214 A1* | 6/2001 | Shastri | G06F 17/30796 725/109 |
| 2002/0092022 A1 | 7/2002 | Dudkicwicz | |
| 2005/0225674 A1 | 10/2005 | Lynch | |
| 2008/0052069 A1 | 2/2008 | Flanagan et al. | |
| 2008/0064326 A1 | 3/2008 | Foster | |
| 2008/0252780 A1* | 10/2008 | Polumbus a/k/a Tad Polumbus | H04N 17/00 348/468 |
| 2008/0295040 A1 | 11/2008 | Crinon | |
| 2011/0072466 A1* | 3/2011 | Basso | G06F 17/30796 725/47 |
| 2011/0164673 A1 | 7/2011 | Shaffer | |
| 2011/0283243 A1 | 11/2011 | Eckhardt | |
| 2012/0016675 A1 | 1/2012 | Hopkins et al. | |
| 2012/0143606 A1 | 6/2012 | Pham | |
| 2012/0304057 A1 | 11/2012 | Labsky et al. | |
| 2013/0114899 A1 | 5/2013 | Ambwani et al. | |
| 2013/0317818 A1 | 11/2013 | Bigham et al. | |
| 2014/0044413 A1 | 2/2014 | Wallace | |
| 2014/0059586 A1 | 2/2014 | Shusman | |
| 2016/0173814 A1 | 6/2016 | Fonseca, Jr. et al. | |

OTHER PUBLICATIONS

The International Search Report (ISR) with Written Opinion for PCT/US2016/018303 dated Jun. 20, 2016.

The International Search Report (ISR) with Written Opinion for PCT/US2016/018307 dated Jun. 16, 2016.

United States Patent and Trademark Office Final Office Action, for U.S. Appl. No. 14/626,592 dated Jan. 9, 2017.

United States Patent and Trademark Office Non-final Office Action, for U.S. Appl. No. 14/626,592 dated Aug. 10, 2016.

United States Patent and Trademark Office Advisory Action, for U.S. Appl. No. 14/626,592 dated Mar. 24, 2017.

nited States Patent and Trademark Office Decision on Appeal, for U.S. Appl. No. 14/626,598, dated Feb. 28, 2018.

United States Patent and Trademark Office Non-final Office Action, for U.S. Appl. No. 14/626,598 dated Aug. 8, 2018.

* cited by examiner

400

Block A

A1.    National News Story: President Signs Budget Bill

A2.    Local News Story: John Smith Wins Lottery

CG Template: T1, CG-Template Text: John Smith

Block B

B1.    Weather: Viewing Area Battered with Severe Storms

B2.    Local Body Shop Sees Increase in Business Due to Hail Damage

Block C

C1.    Sports News Story: Chicago Shooters Team Win Championship

CG Template: T2, CG-Template Text: Chicago Shooters

FIG. 4

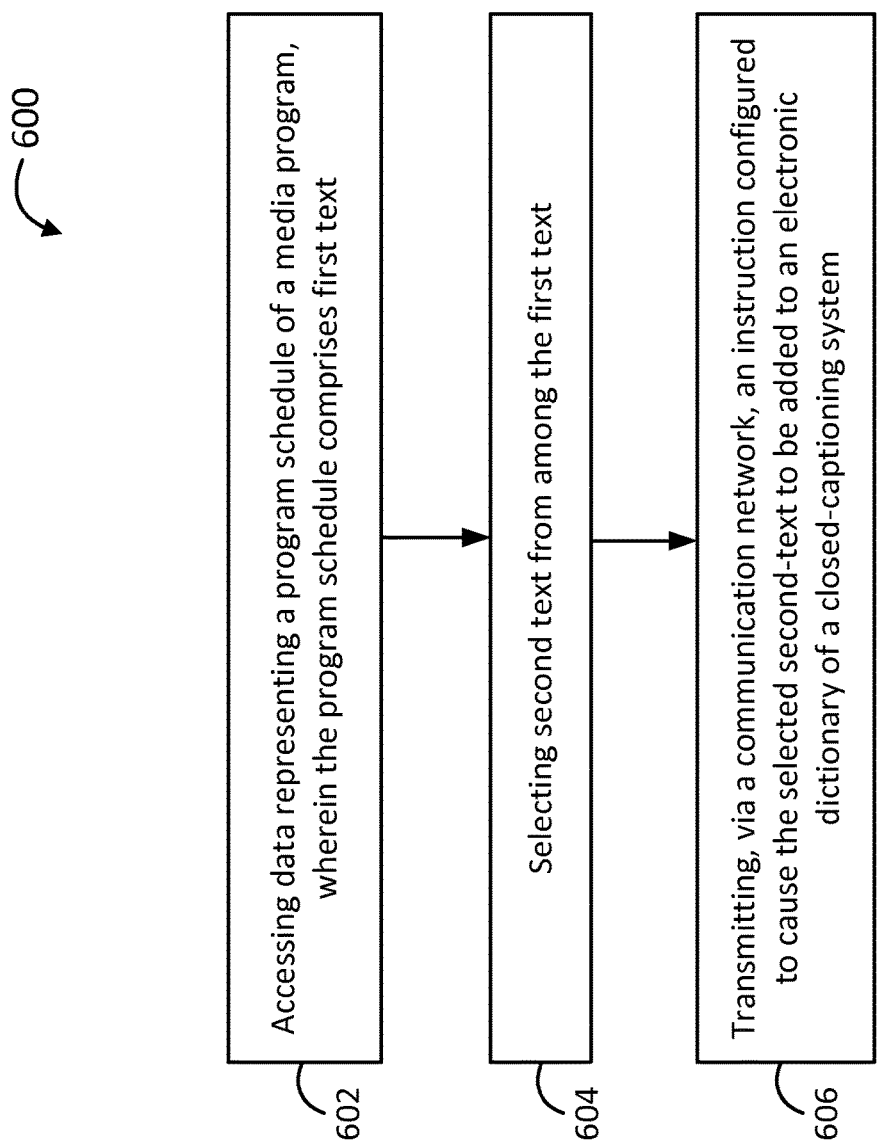

USE OF A PROGRAM SCHEDULE TO MODIFY AN ELECTRONIC DICTIONARY OF A CLOSED-CAPTIONING GENERATOR

REFERENCE TO RELATED APPLICATION

This disclosure is a continuation of U.S. patent application Ser. No. 14/626,592, filed Feb. 19, 2015, the entirety of which is hereby incorporated by reference.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

Closed-captioning is a video-related service that was developed for the hearing-impaired. When closed-captioning is enabled, a media program and closed-captioning text (CC text) representing an audio portion of the media program are displayed as the media program is played. The CC text may represent, for example, spoken dialog or sound effects of the media program, thereby helping a viewer to comprehend what is being presented in the media program. Closed-captioning may also be disabled such that the media program may be displayed without the CC text.

CC text may be generated in a variety of manners. For example, a computer-based automatic speech-recognition system may convert spoken dialog into text. Another technique may involve an individual listening to an audio portion of a media program and manually typing out corresponding text. This individual is sometimes referred to as a "captioner."

After the CC text is generated, it may be encoded and stored in the form of closed-captioning data (CC data). CC data may then be embedded in or otherwise associated with the corresponding media program. In some cases, a broadcasting system may add the CC data to a video portion of a media program, for example in line 21 of an analog format broadcast according to the National Televisions Systems Committee (NTSC) standard, and may then broadcast the updated media program to an audience.

SUMMARY

In a first aspect, an example method involves accessing data representing a program schedule of a media program, wherein the program schedule comprises first text. The method also involves selecting second text from among the first text. The method further involves transmitting, via a communication network, an instruction configured to cause the selected second-text to be added to an electronic dictionary of a closed-captioning generator.

In a second aspect, an example non-transitory computer-readable medium has stored thereon program instructions that when executed cause performance of a set of acts including accessing data representing a program schedule of a media program, wherein the program schedule comprises first text. The set of acts also includes selecting second text from among the first text. The set of acts further includes transmitting, via a communication network, an instruction configured to cause the selected second-text to be added to an electronic dictionary of a closed-captioning generator.

In a third aspect, an example system includes a processor. The example system also includes a computer-readable medium having stored thereon program instructions that when executed by the processor cause the system to perform a set of acts including accessing data representing a program schedule of a media program, wherein the program schedule comprises first text. The set of acts also includes selecting second text from among the first text. The set of acts further includes transmitting, via a communication network, an instruction configured to cause the selected second-text to be added to an electronic dictionary of a closed-captioning generator.

BRIEF DESCRIPTION OF THE DRAWINGS

FIG. 4 is a schematic diagram illustrating an example program schedule according to the present disclosure.

FIG. 6 is a flow chart illustrating an example method according to the present disclosure.

DETAILED DESCRIPTION

I. Overview

Figure 1:
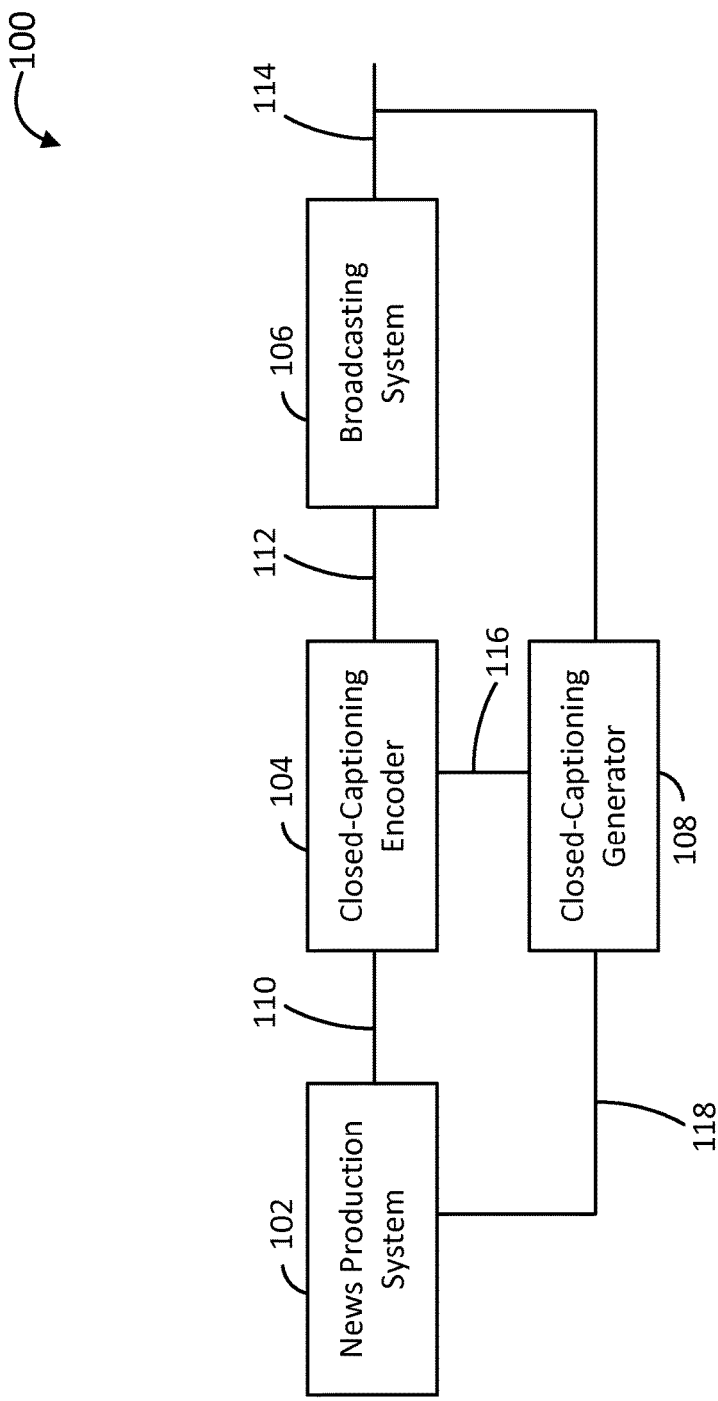
FIG. 1 is a simplified block diagram illustrating an example system according to the present disclosure.

As indicated above, to generate CC text, a captioner may listen to an audio portion of a media program and manually type out corresponding text. To help facilitate this process, the captioner may use a closed-captioning generator. For example, the captioner may use a stenotype machine, which allows the captioner to type out terms phonetically. The machine may then convert phonetic input into corresponding text. To facilitate this, the machine may consult an electronic dictionary, which specifies terms that phonetic input may correspond to. In one example, these terms may include words found in a traditional dictionary.

In the case where a captioner attempts to phonetically spell a term that is not included in the electronic dictionary, the stenotype machine may have difficulty converting the phonetic input into the desired term. This may especially be an issue when the captioner has difficulty hearing or spelling a term, as the captioner may provide inaccurate phonetic input. In such cases, the captioner may also be slow to provide the phonetic input, which in turn may cause a broadcast delay between a media program and its corresponding CC text.

These issues may be particularly common in connection with certain types of media programs due to the nature of their content. For instance, they may be common in connection with a news program. This is because during the production of a news program, it may be common for an anchorperson to refer to proper names and places, and these terms may be unlikely to be included in a traditional electronic dictionary.

To help address these issues, according to the present disclosure, a computing device may cause text related to a media program to be added to an electronic dictionary of a closed-captioning generator used in connection with generating CC text for the media program. This related text may be selected from a program schedule of the media program.

A program schedule of a media program is a schedule or a summary of the media program, and is typically used to facilitate the production of the media program, such as by coordinating the use of various media content items. In one example, the program schedule may include text corresponding to a sequence of media-program portions (e.g., news stories) that make up the media program. Further, the program schedule may include text for an anchorperson to read aloud as the media program progresses. In addition, the program schedule may include information included as part of character generator (CG) templates. Such information may include, for example, text to be added to a CG template. This text may be referred to as "CG-template text."

In some cases, the CG-template text may be spoken by an anchorperson during a broadcast of the media program, and thus may be heard by a captioner generating the corresponding CC text. Given this, it may be beneficial to add such text to the electronic dictionary used by the captioner. Indeed, this may allow the captioner to more quickly and accurately generate CC text for the media program.

According to the present disclosure, an example method may involve (i) a computing device accessing data representing a program schedule of a media program that includes first text, (ii) the computing device selecting second text from among the first text, and (iii) the computing device transmitting, via a communication network, an instruction configured to cause the selected second-text to be added to an electronic dictionary of a closed-captioning generator. In one example, the first text may include some or all of the text included in a program schedule, and the second text may include a subset of the first text, for example, CG-template text.

Other approaches and variations are possible and contemplated within the scope of this disclosure. For example, the method may further involve the computing device receiving an indication of the media program, and the act of accessing data representing the program schedule of the media program may involve accessing data representing the program schedule of the indicated media-program.

In one example, the method may further involve extracting from the first text third text that satisfies one or more criterion, and selecting, as the second text, the extracted third-text. By way of example, the first text may include all text included within a program schedule. The method may involve extracting from that text, all text meeting one or more criteria, such as proper nouns, all text meeting a threshold length, and/or all text beginning with a capital letter, for example.

The method may further involve the computing device transmitting, via a communication network, an instruction configured to cause the selected second-text to be deleted from the electronic dictionary of the closed-captioning generator.

In one example, the act of transmitting the instruction configured to cause the selected second-text to be added to the electronic dictionary may occur proximate a start time of a broadcast of the media program. Further, the act of transmitting the instruction configured to cause the selected second-text to be deleted from the electronic dictionary may occur proximate an end time of a broadcast of the media program.

II. Example System

FIG. 1 is a simplified block diagram illustrating an example system 100. The system 100 may include an NPS 102, a closed-captioning encoder 104, a broadcasting system 106, and a closed-captioning generator 108. The components of the system 100 may be connected with each other and/or with other devices (or systems) via one or more communication paths. For example, a communication path 110 may connect the NPS 102 to the encoder 104, a communication path 112 may connect the encoder 104 to the broadcasting system 106, a communication path 114 may connect the broadcasting system 106 to the generator 108, a communication path 116 may connect the generator 108 to the encoder 104, and a communication path 118 may connect the generator 108 to the NPS 102. Each communication path may traverse a communication network.

Through these communication paths, a device may transmit various types of data to one or more other devices. For example, one device may transmit instructions to a second device to control the second device. As another example, one device may transmit a media stream or CC data to another device. As a further example, the NPS 102 may transmit to the generator 108 an instruction configured to cause the generator 108 to add or remove text from an electronic dictionary of the generator 108. Such devices and systems may exchange data according to one or more standards or protocols. For example, one device may transmit data to another device in the form of a packet stream.

The NPS 102 may be implemented as a computing device, and may be configured for performing various operations including, for example, producing a news program. The NPS 102 may also be configured for providing to the encoder 104, a media stream representing a news program. The news program may be an audio and/or video program, and thus the media stream may be an audio and/or video stream. The media stream may also include other information such as embedded data, metadata, or CC data, for example.

The encoder 104 may be implemented as a computing device, and may be configured for performing various operations, including for example, adding CC data to a media stream. The encoder 104 may receive a media stream from the NPS 102, and may receive CC data from the generator 108. Then, the encoder 104 may add the received CC data to the received media stream, and may output the modified media stream to the broadcasting system 106. Examples of the encoder 104 include the 7700 Series Closed-Captioning Translator provided by Evertz Microsystems, Ltd. of Ontario Canada and the HD490 Closed-Captioning Encoder provided by EEG Enterprises of Farmingdale, N.Y.

The broadcasting system 106 may be implemented as a computing device, and may be configured for performing various operations, including for example, transmitting a media stream to one or more receiver devices (e.g., televisions or set-top boxes). The broadcasting system 106 may receive the modified media stream from the encoder 104, and may transmit the modified media stream to an audience, and/or to the generator 108. In one example, the broadcasting system 106 may transmit the audio portion, but not the video portion, of the media stream to the generator 108. Other variations are possible as well.

The generator 108 may be implemented as a computing device, and may take a variety of forms. For example, the generator 108 may take the form of a stenotype machine.

The generator 108 may include an electronic dictionary stored in a data storage. In one example, the electronic dictionary may be stored in the form of a text file.

The generator 108 may be configured for performing various operations, including for example, generating CC data. The generator 108 may also be configured for transmitting CC data to the encoder 104. Further, the generator 108 may be configured for communicating with the NPS 102. In some instances, the generator 108 may be located in a location different from that of the NPS 102. This may allow a captioner to work remotely from the NPS 102. An example of the generator 108 includes the Passport Touch provided by Advantage Software of Stuart, Fla.

Figure 2:
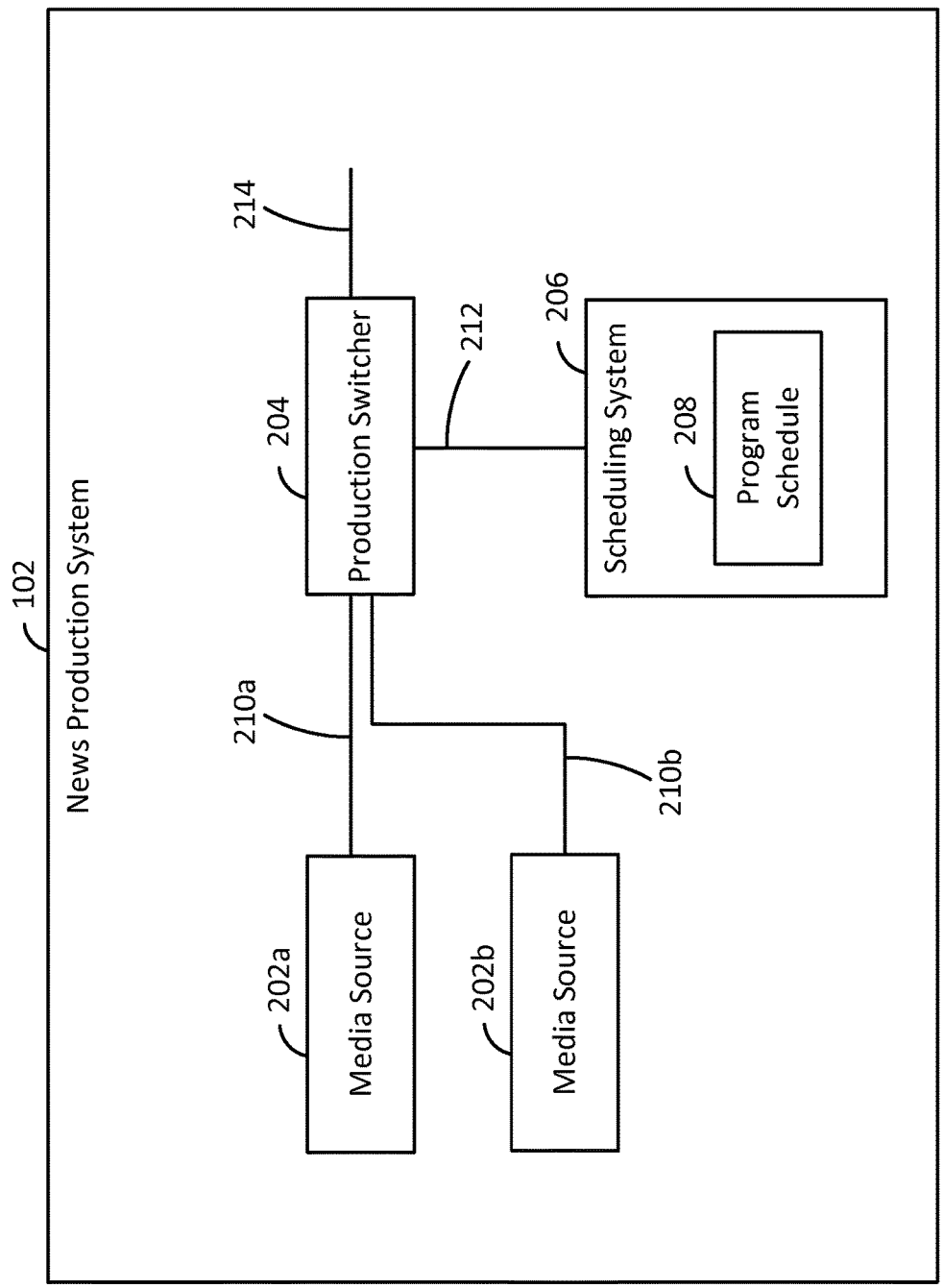
FIG. 2 is a simplified block diagram illustrating an example news-production system (NPS) according to the present disclosure.

FIG. 2 is a simplified block diagram illustrating an example NPS 102. The NPS 102 may include media sources 202a, 202b, a production switcher 204, and a scheduling system 206.

The components of the NPS 102 may be connected with each other and/or with other devices (or systems) via one or more communication paths. For example, a communication path 210a may connect the media source 202a to an input of the production switcher 204, a communication path 210b may connect the media source 202b to another input of the production switcher 204, and a communication path 214 may connect an output of the production switcher 204 to another device or system. Further, a communication path 212 may connect the production switcher 204 to the scheduling system 206.

Generally, each media source 202a, 202b is configured for outputting a media stream such that it may be used by the NPS 102. Each media source 202a, 202b may take a variety of forms. For example, each media source 202a, 202b may take the form of a satellite receiver, video camera, or media server. An example media server is the K2 server provided by Grass Valley™ of San Francisco, Calif.

The media stream may be transmitted according to a variety of different standards. For instance, a media stream may be transmitted according to the high-definition serial digital interface (HD-SDI) (with a data transfer rate of 1.485 Gbps).

The production switcher 204 may be implemented as a computing device, and may be configured for using one or more input media streams to generate an output media stream. This may involve the production switcher 204 switching between and/or combining multiple media streams output by the media sources 202a, 202b to generate a news program in the form of another media stream. The production switcher 204 may then output that media stream to another system or device.

In some instances, the production switcher 204 may be configured for performing functions or acts related to digital video effects (DVEs). For example, the production switcher 204 may design or execute a DVE, perhaps based on input received from a user. In addition, the production switcher may store or retrieve data (e.g., program instructions) representing a DVE.

As a result of the production switcher 204 executing a DVE, the production switcher 204 may generate a media stream. As such, the design of a DVE may affect the corresponding generated media stream. In one example, a DVE may be designed such that the production switcher 204 generates the corresponding media stream by manipulating an input media stream, such as by scaling video content represented by the input media stream and/or by overlaying a CG template on the video content. As such, executing a DVE may cause the name of a person or place to appear on screen during a broadcast.

The scheduling system 206 may be implemented as a computing device, and may include, stored in a data storage, a program schedule of a media program.

Generally, the scheduling system 206 may be configured for performing functions related to scheduling and managing the production of a media program. For example, the scheduling system 206 may be configured for creating and/or editing a program schedule of a news program based on input received via a user-interface. Further, the scheduling system 206 may be configured for traversing or processing entries in the program schedule by controlling one or more other devices in the NPS 102. For example, the scheduling system 206 may control the production switcher 204.

The program schedule 208 may include an outline of a predetermined sequence of media-program portions that make up the news program. Further, the program schedule may include text for an anchorperson to read aloud as the news program progresses. In addition, the program schedule may include information included as part of CG templates scheduled to be used in connection with the news program. Such information may include, for example, CG-template text.

Figure 3:
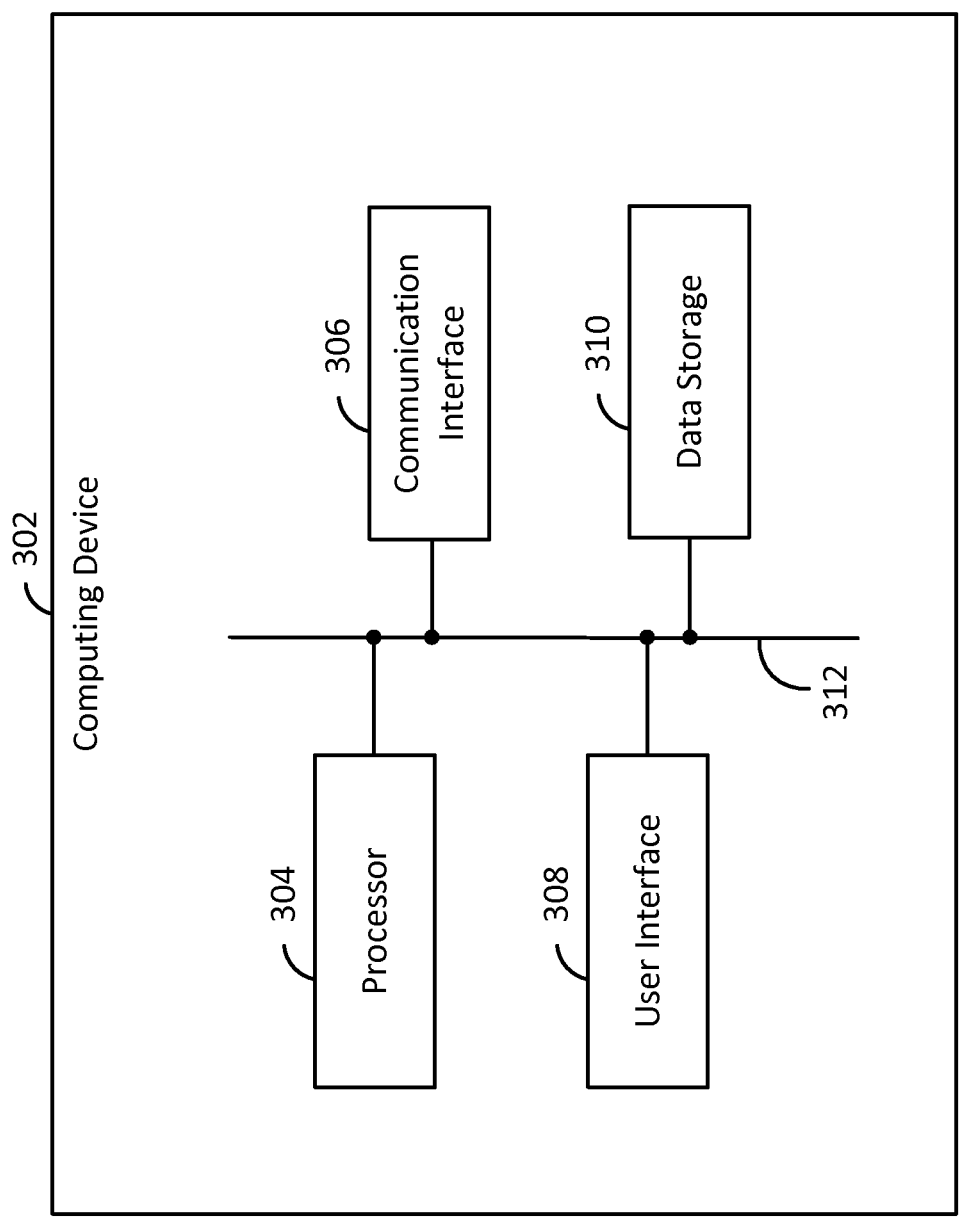
FIG. 3 is a simplified block diagram illustrating an example computing device according to the present disclosure.

FIG. 3 is a simplified block diagram illustrating an example computing device 302. The computing device 302 may be configured for performing a variety of functions or acts, such as those described in this disclosure (including the accompanying drawings). The computing device 302 may include various components, including for example, a processor 304, a communication interface 306, a user interface 308, and a data storage 310. The components of the computing device 302 may be communicatively connected to each other (or other devices or systems) via a system bus, network, or other connection mechanism 312.

The processor 304 may include a general purpose processor (e.g., a microprocessor) and/or a special purpose processor (e.g., a digital signal processor (DSP)).

The communication interface 306 may be configured to allow the computing device 302 to communicate with one or more devices (or systems) according to one or more protocols. In one example, the communication interface 306 may be a wired interface, such as an Ethernet interface. As another example, the communication interface 306 may be a wireless interface, such as a cellular or WI-FI interface.

The user interface 308 may facilitate interaction with a user of the computing device, if applicable. As such, the user interface 308 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage 310 may include one or more volatile, non-volatile, removable, and/or non-removable storage components, such as magnetic, optical, or flash storage, and may be integrated in whole or in part with the processor 304. Further, the data storage 310 may take the form of a non-transitory computer-readable storage medium, having stored thereon program instructions (e.g., compiled or non-compiled program logic and/or machine code) that, when executed by the processor 304, cause the computing device 302 to perform one or more functions or acts, such as those described in this disclosure. Such program instructions may define or be part of a discrete software application that can be executed in response to certain inputs received from the user interface 308, for instance. The data storage 310 may also store other types of information or data, such as those types described throughout this disclosure.

FIG. 4 is a schematic diagram illustrating an example program schedule 400. The program schedule 400 may include text organized into an outline or schedule of the media program. For example, Block A may include news stories A1 and A2, Block B may include news stories B1 and B2, and Block C may include news story C1. As shown, the program schedule 400 may include, for news story A2, an indication of a CG Template, namely "T1," and corresponding CG-template Text, namely "John Smith." Accordingly, when this CG template is used during the A2 portion of the news program, the text "John Smith" may be overlaid on a portion of the A2 portion (that shows John Smith). Similarly, the program schedule 400 may include, for news story C1, an indication of a CG Template, namely "T2," and corresponding CG-Template Text, namely "Chicago Shooters." When this CG template is used during the C1 portion of the news program, the text "Chicago Shooters" may be overlaid on a portion of the C1 portion (that shows the Chicago Shooters team).

Figure 5B:
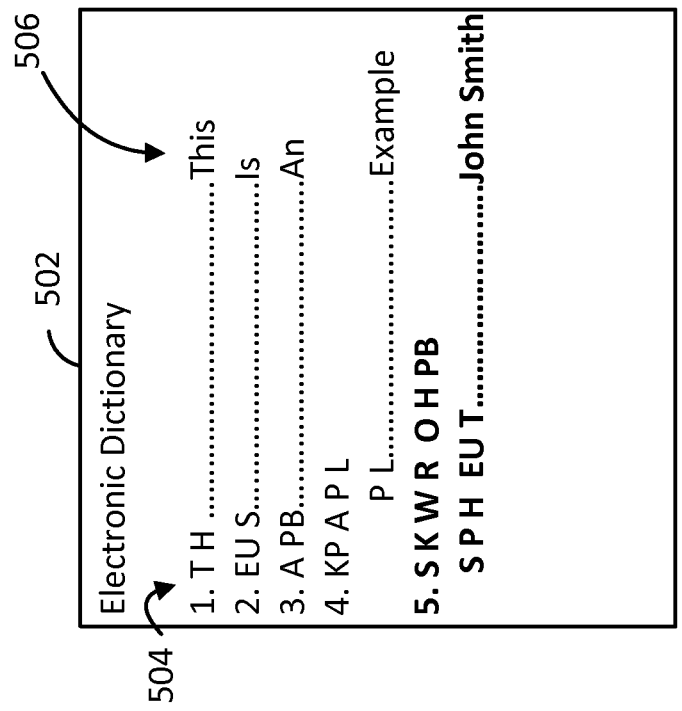
FIG. 5b is a schematic diagram illustrating the example electronic dictionary in a second state.
Figure 5A:
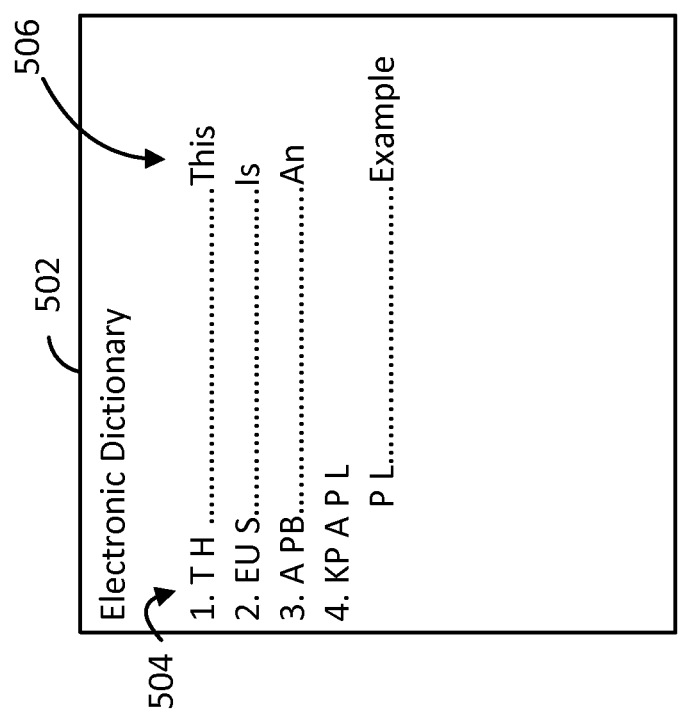
FIG. 5a is a schematic diagram illustrating an example electronic dictionary according to the present disclosure, the dictionary being in a first state.

FIGS. 5a and 5b are schematic diagrams illustrating an example electronic dictionary 502 in a first and second state, respectively. Between the first and second states, the term "John Smith" has been added to the dictionary 502.

In one example system, the dictionary 502 may be used in connection with the generator 108. In particular, the dictionary 502 may facilitate the process of the generator 108 converting phonetic input to corresponding text by allowing the generator 108 to consider terms 506 that phonetic input may represent. In some cases, the dictionary 502 may further include one or more common phonetic spellings 504 of such terms 506. As an example, the dictionary 502 may include the phonetic spelling "T H," which may correspond to the term "This."

In some examples, the generator 108 (or another device) may be configured to edit the dictionary 502. For example, the generator 108 may edit the dictionary 502 by adding to the dictionary 502 the term "John Smith" and/or the corresponding phonetic spelling as shown in FIG. 5b. The generator 108 may also edit the dictionary 502 by removing from the dictionary 502 a term 506 and/or a corresponding phonetic spelling 504. In some instances, the generator 108 may provide an application programming interface (API) that allows another device to send instructions to the generator 108 to cause the generator 108 to edit the dictionary 502.

III. Example Operations

FIG. 6 is a flow chart illustrating an example method 600. At block 602, the method may involve accessing data representing a program schedule of a media program, wherein the program schedule includes first text. For instance, this may involve the NPS 102 accessing the program schedule 208. The program schedule 208 may include first text, such as CG-template text.

In some examples, the method 600 may involve receiving an indication of a media program, wherein accessing data representing the program schedule of the media program involves accessing data representing the program schedule of the indicated media-program. For instance, this may involve the NPS 102 receiving the indication, and then accessing data representing the program schedule of the indicated media-program. This may allow a captioner to indicate a particular news program for which CC data is to be generated. Based on this indication, the NPS 102 may use a corresponding program schedule for the purposes of editing an electronic dictionary used by the captioner.

At block 604, the method 600 may involve selecting second text from among the first text. For instance, this may involve the NPS 102 selecting second text from among the first text. The second text may include CG-template text or media-program portion titles, for example. In another example, the second text may be the entire first text included in the program schedule.

In some examples, selecting second text from among the first text may involve extracting, from the first text, third text that satisfies one or more criterion, and selecting, as the second text, the extracted third-text. For instance, the criterion may be all proper nouns, all text meeting a threshold length, and/or all text beginning with a capital letter, for example. In these examples, the NPS 102 may extract text meeting the criterion and disregard the other text included in the program schedule.

At block 606, method 600 may involve transmitting, via a communication network, an instruction configured to cause the selected second-text to be added to an electronic dictionary of a closed-captioning generator. For instance, this may involve the NPS 102 transmitting to the generator 108, via the path 102, an instruction configured to cause the selected second-text to be added to the electronic dictionary 502, as described above with reference to FIGS. 5a and 5b.

In response to receiving this instruction, the generator 108 may add the selected second-text to the electronic dictionary 502, for example by adding a new entry to a corresponding text file or database.

In some instances, method 600 may further involve transmitting, via a communication network, an instruction configured to cause the selected second-text to be deleted from an electronic dictionary of a closed-captioning generator. For instance, this may involve the NPS 102 transmitting to the generator 108, via the path 102, an instruction configured to cause the selected second-text to be deleted from the electronic dictionary 502.

In response to receiving this instruction, the generator 108 may delete the selected second-text to the electronic dictionary 502, for example by deleting an existing entry from a corresponding text file or database.

In some examples, the act of transmitting, via the communication network, the instruction configured to cause the selected second-text to be added to the electronic dictionary of the closed-captioning generator may occur proximate a start time of a broadcast of the media program. Further, the act of transmitting, via a communication network, the instruction configured to cause the selected second-text to be deleted from the electronic dictionary of the closed-captioning generator may occur proximate an end time of a broadcast of the media program. This may allow for the electronic dictionary to be edited for use in connection with a particular media program specifically during the time period in which CC data for that particular media program is being generated.

IV. Example Variations

While one or more acts have been described as being performed by certain devices, systems, or entities (e.g., the NPS 102), the acts may be performed by any device, system, or entity, such as those described in connection with the system 100. Furthermore, the devices and systems need not be discrete entities. Some or all of the devices or systems may be combined in a single device.

In addition, the acts described herein need not be performed in the disclosed order, although in some examples an order may be preferred. Also, not all acts need be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

What is claimed is:

1. A method comprising:
accessing, by a computing system, a program schedule of a media program, wherein the program schedule comprises first program schedule text, and wherein the program schedule is used to facilitate production of the media program;
selecting, by the computing system, second program schedule text from among the first program schedule text; and
transmitting, by the computing system and via a communication network, an instruction that causes the selected second program schedule text to be added to an electronic dictionary of a closed-captioning generator, wherein the closed-captioning generator is configured to use the electronic dictionary to convert closed-captioning input into corresponding closed-captioning text.

2. The method of claim 1, further comprising:
receiving an indication of the media program, wherein accessing the program schedule of the media program comprises accessing the program schedule of the indicated media-program.

3. The method of claim 1, wherein the first program schedule text comprises text included as part of a character-generator template.

4. The method of claim 1, wherein selecting second program schedule text from among the first program schedule text comprises:
extracting, from the first program schedule text, third program schedule text that satisfies one or more criterion; and
selecting, as the second program schedule text, the extracted third program schedule text.

5. The method of claim 4, wherein the one or more criterion comprises a criterion that the third program schedule text comprises a proper noun.

6. The method of claim 1, wherein transmitting, via the communication network, the instruction that causes the selected second program schedule text to be added to the electronic dictionary of the closed-captioning generator comprises transmitting, via the communication network, proximate a start time of a broadcast of the media program, the instruction that causes the selected second program schedule text to be added to the electronic dictionary of the closed-captioning generator.

7. The method of claim 1, further comprising:
transmitting, by the computing system and via the communication network, an instruction that causes the selected second program schedule text to be deleted from the electronic dictionary of the closed-captioning generator.

8. The method of claim 7, wherein transmitting, via the communication network, the instruction that causes the selected second program schedule text to be deleted from the electronic dictionary of the closed-captioning generator comprises transmitting, via the communication network, proximate an end time of a broadcast of the media program, the instruction that causes the selected second program schedule text to be deleted from the electronic dictionary of the closed-captioning generator.

9. The method of claim 1, wherein the media program comprises a news program.

10. The method of claim 1, wherein the closed-captioning generator comprises a stenotype machine.

11. A non-transitory computer-readable medium having stored thereon program instructions that when executed cause a computing system to perform a set of acts comprising:
accessing a program schedule of a media program, wherein the program schedule comprises first program schedule text, and wherein the program schedule is used to facilitate production of the media program;
selecting second program schedule text from among the first program schedule text; and
transmitting, via a communication network, an instruction that causes the selected second program schedule text to be added to an electronic dictionary of a closed-captioning generator, wherein the closed-captioning generator is configured to use the electronic dictionary to convert closed-captioning input into corresponding closed-captioning text.

12. The computer-readable medium of claim 11, the set of acts further comprising:
receiving an indication of the media program, wherein accessing the program schedule of the media program comprises accessing the program schedule of the indicated media-program.

13. The computer-readable medium of claim 11, wherein the first program schedule text comprises text included as part of a character-generator template.

14. The computer-readable medium of claim 11, wherein selecting second program schedule text from among the first program schedule text comprises:
extracting from the first program schedule text, third program schedule text that satisfies one or more criterion; and
selecting, as the second program schedule text, the extracted third program schedule text.

15. The computer-readable medium of claim 14, wherein the one or more criterion comprises a criterion that the third program schedule text comprises a proper noun.

16. The computer-readable medium of claim 11, wherein transmitting, via the communication network, the instruction that causes the selected second program schedule text to be added to the electronic dictionary of the closed-captioning generator comprises transmitting, via the communication network, proximate a start time of a broadcast of the media program, the instruction that causes the selected second program schedule text to be added to the electronic dictionary of the closed-captioning generator.

17. The computer-readable medium of claim 11, the set of acts further comprising:
transmitting, via the communication network, an instruction that causes the selected second program schedule text to be deleted from the electronic dictionary of the closed-captioning generator.

18. The computer-readable medium of claim 17, wherein transmitting, via the communication network, the instruction that causes the selected second program schedule text to be deleted from the electronic dictionary of the closed-captioning generator comprises transmitting, via the communication network, proximate an end time of a broadcast of the media program, the instruction that causes the selected second program schedule text to be deleted from the electronic dictionary of the closed-captioning generator.

19. The computer-readable medium of claim 11, wherein the media program comprises a news program.

20. A system comprising:
one or more processors; and
tangible, non-transitory, computer-readable media having instructions stored thereon, wherein the instructions, when executed by the one or more processors, cause the system to perform a set of acts comprising:
accessing a program schedule of a media program, wherein the program schedule comprises first program schedule text, and wherein the program schedule is used to facilitate production of the media program;
selecting second program schedule text from among the first program schedule text; and
transmitting, via a communication network, an instruction that causes the selected second program schedule text to be added to an electronic dictionary of a closed-captioning generator, wherein the closed-captioning generator is configured to use the electronic dictionary to convert closed-captioning input into corresponding closed-captioning text.

* * * * *